UNITED STATES PATENT OFFICE.

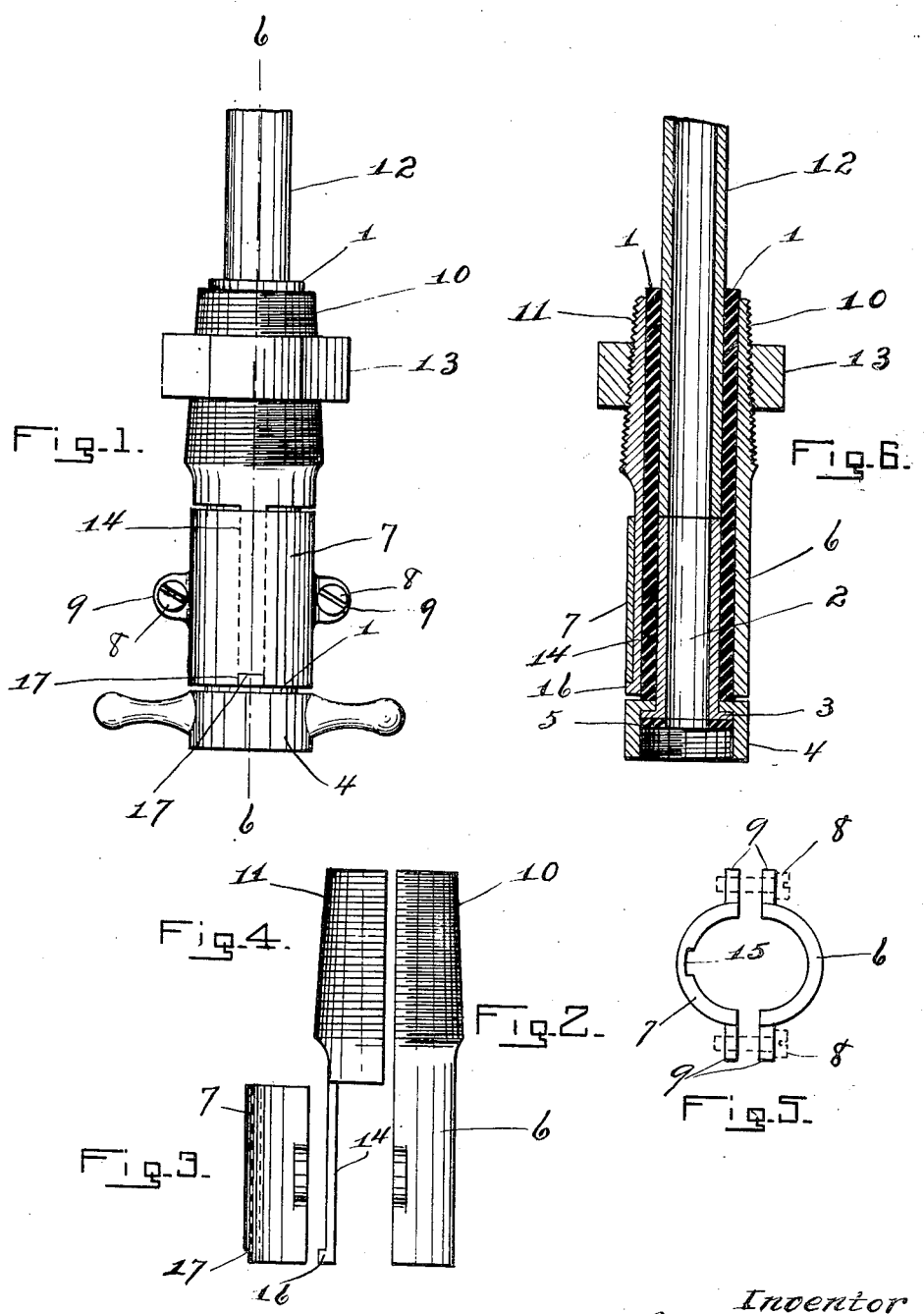
J. PILLIG.
PIPE CONNECTION.
APPLICATION FILED NOV. 21, 1917.
1,283,554.
Patented Nov. 5, 1918.

JOHN PILLIG, OF AMSTERDAM, NEW YORK.

PIPE CONNECTION.

1,283,554.      Specification of Letters Patent.      Patented Nov. 5, 1918.

Application filed November 21, 1917. Serial No. 203,133.

*To all whom it may concern:*

Be it known that I, JOHN PILLIG, a citizen of the United States, residing at Amsterdam, county of Montgomery, and State of New York, have invented certain new and useful Improvements in Pipe Connections, of which the following is a specification.

Reference may be had to the accompanying drawings, and the reference characters marked thereon, which form a part of this specification. Similar characters refer to similar parts in the several figures therein.

This invention relates to means for coupling together the neighboring ends of two pipes arranged end to end.

The principal object of the invention is to facilitate connecting and disconnecting said pipes.

Other objects will appear in connection with the following description.

Figure 1 is a view in side elevation of a pipe-connection embodying my invention.

Fig. 2 is a view in side elevation of the longer clamping-member detached.

Fig. 3 is a view in side elevation of one of the shorter clamping-members, adapted to coöperate with one end of the longer clamping-member.

Fig. 4 is a view in side elevation of the other shorter clamping-member, adapted to coöperate with the other end of said longer clamping-member.

Fig. 5 is a bottom plan view of the longer clamping-member and the shorter clamping-member shown in Fig. 3, slightly separated from each other.

Fig. 6 is a central longitudinal section of the pipe-connection taken on the broken line 6—6 in Fig. 1.

Referring to the drawings wherein the invention is shown in preferred form, 1 is a rubber sleeve, which incloses a nipple, 2, having a flange, 3, engaged by a coupling-sleeve, 4, which is adapted to screw on to the nipple of a beer-barrel or the like, not shown.

A rubber-washer, 5, within the sleeve, 4, serves to make a tight connection with said nipple on the beer-barrel.

The lower end of the rubber sleeve, 1, is clamped upon the nipple, 2, by two semicylindrical clamping-members, 6 and 7, drawn together by screws, 8, inserted through ears, 9, on the clamping-members.

The clamping-member, 6, is elongated to extend along one side of the rubber sleeve, 1, past the joint between the abutting ends of said nipple, 2, and a pipe, 12, inserted within the other end of the rubber sleeve, 1.

The upper end of the clamping-member 6 is tapered and screw-threaded as at 10; and, disposed opposite said tapered screw-threaded portion, and on the opposite side of said rubber sleeve is a similarly tapered screw-threaded shorter clamping-member, 11, said tapered screw-threaded clamping-members being adapted to be drawn together by means of a nut, 13, fitting their screw-threaded portions.

The pipe, 12, may be a beer-pipe leading to a bar-faucet, not shown.

The nipple, 2, and pipe, 12, however, may be any pipes which it is desired to connect together.

The clamping-member, 11, has a leg, 14, which projects downward through a groove, 15, in the clamping-member, 7, and has a lug, 16, which engages a notch, 17, in the lower end of said clamping-member, 7, whereby the clamping-member, 11, is keyed to the clamping-member, 7.

By loosening the nut, 13, the pipe, 12, can be inserted within, or removed from, the rubber sleeve, 1, and by tightening the nut, 13, the rubber sleeve, 1, can be clamped tightly upon the pipe, 12, to make a tight joint.

The pipe, 12, can thus be connected and disconnected from the nipple or pipe, 2, without disturbing the connection between the nipple or pipe, 2, and the rubber sleeve, 1.

In like manner, the nipple, 2, can be disconnected from the pipe, 12, and from the rubber sleeve, 1, by loosening the screws, 8, without interfering with the connection between the rubber sleeve, 1, and the pipe, 12.

While I have described the sleeve, 1, as made of rubber, it may be made of any material which can be sufficiently compressed by the clamping-members to make tight engagement with the inserted ends of the pipes which are to be connected together.

What I claim as new and desire to secure by Letters Patent is—

1. In a pipe-connection and in combination, a compressible sleeve adapted to inclose the abutting ends of two pipes arranged end to end; a substantially semicylindrical clamping-member extending along one side of said compressible sleeve past the joint between said pipe-ends; a second substantially semicylindrical clamping-member engageable with the opposite side of said compressible sleeve coöperative with said first-mentioned clamping-member on one side of said joint, said clamping-members being similarly tapered and screw-threaded; a nut engageable with the tapered screw-threaded portions of said clamping-members; and a third clamping-member engageable with said compressible sleeve coöperative with said first-mentioned clamping-member on the other side of said joint.

2. In a pipe-connection and in combination, a compressible sleeve adapted to inclose the abutting ends of two pipes arranged end to end; a substantially semicylindrical clamping-member extending along one side of said compressible sleeve past the joint between said pipe-ends; and separate substantially semi-cylindrical clamping-members engageable with the opposite side of said compressible sleeve, one on one side, and the other on the opposite side of, said joint between said pipe-ends.

3. In a pipe-connection and in combination, a compressible sleeve adapted to inclose the abutting ends of two pipes arranged end to end; a substantially semicylindrical clamping-member extending along one side of said compressible sleeve past the joint between said pipe-ends; a clamping-member coöperative with said first-mentioned clamping-member on one side of said joint; means for drawing said clamping-members together to compress said sleeve; a third clamping-member, separate from and keyed to said second-mentioned clamping-member, engageable with said opposite side of said compressible sleeve, coöperative with said first-mentioned clamping-member on the other side of said joint, said first-mentioned and said last-mentioned clamping-members being tapered and screw-threaded; and a nut engaging said tapered screw-threaded portions of said two last-mentioned clamping-members.

In testimony whereof, I have hereunto set my hand this 13th day of November, 1917.

JOHN PILLIG.